US009586324B2

United States Patent
Som

(10) Patent No.: US 9,586,324 B2
(45) Date of Patent: Mar. 7, 2017

(54) METHOD FOR OPERATING AN INDUSTRIAL ROBOT, AND A SECURE MONITORING DEVICE FOR CARRYING OUT SAID METHOD

(71) Applicant: REIS GROUP HOLDING GMBH & CO. KG, Obernburg (DE)

(72) Inventor: Franz Som, Lutzelbach (DE)

(73) Assignee: REIS GROUP HOLDING GMBH & CO. KG, Obernburg (DE)

( * ) Notice: Subject to any disclaimer, the term of this patent is extended or adjusted under 35 U.S.C. 154(b) by 45 days.

(21) Appl. No.: 14/413,327

(22) PCT Filed: Jul. 16, 2013

(86) PCT No.: PCT/EP2013/064979
§ 371 (c)(1),
(2) Date: Jan. 7, 2015

(87) PCT Pub. No.: WO2014/012919
PCT Pub. Date: Jan. 23, 2014

(65) Prior Publication Data
US 2015/0174767 A1 Jun. 25, 2015

(30) Foreign Application Priority Data
Jul. 17, 2012 (DE) .................. 10 2012 106 448

(51) Int. Cl.
*B25J 13/06* (2006.01)
*B25J 11/00* (2006.01)
(Continued)

(52) U.S. Cl.
CPC .......... *B25J 13/06* (2013.01); *B25J 11/0005* (2013.01); *G01B 11/03* (2013.01); *G05B 19/409* (2013.01);
(Continued)

(58) Field of Classification Search
CPC ...... B25J 11/0005; G01B 11/03; G01B 5/008; G05B 2219/36168; G05B 2219/39438;
(Continued)

(56) References Cited

U.S. PATENT DOCUMENTS 5,465,215 A * 11/1995 Strickland ............ G05B 19/409
700/180
5,705,906 A * 1/1998 Tanabe .................. B25J 9/1671
318/567

(Continued)

FOREIGN PATENT DOCUMENTS

CN 101171105 A 4/2008
DE 102005040714 A1 3/2007
(Continued)

OTHER PUBLICATIONS

Chinese Office Action dated Oct. 26, 2015, corresponding to Chinese Patent Application No. 201380038147.3.
(Continued)

*Primary Examiner* — Jason Holloway
(74) *Attorney, Agent, or Firm* — Ladas & Parry LLP

(57) ABSTRACT

The invention relates to a method and a device for operating an industrial robot by means of an operating device, and includes a graphical operator interface, such as a touch-sensitive display, the robot being connected to a robot control unit.

36 Claims, 11 Drawing Sheets

Figure 1:
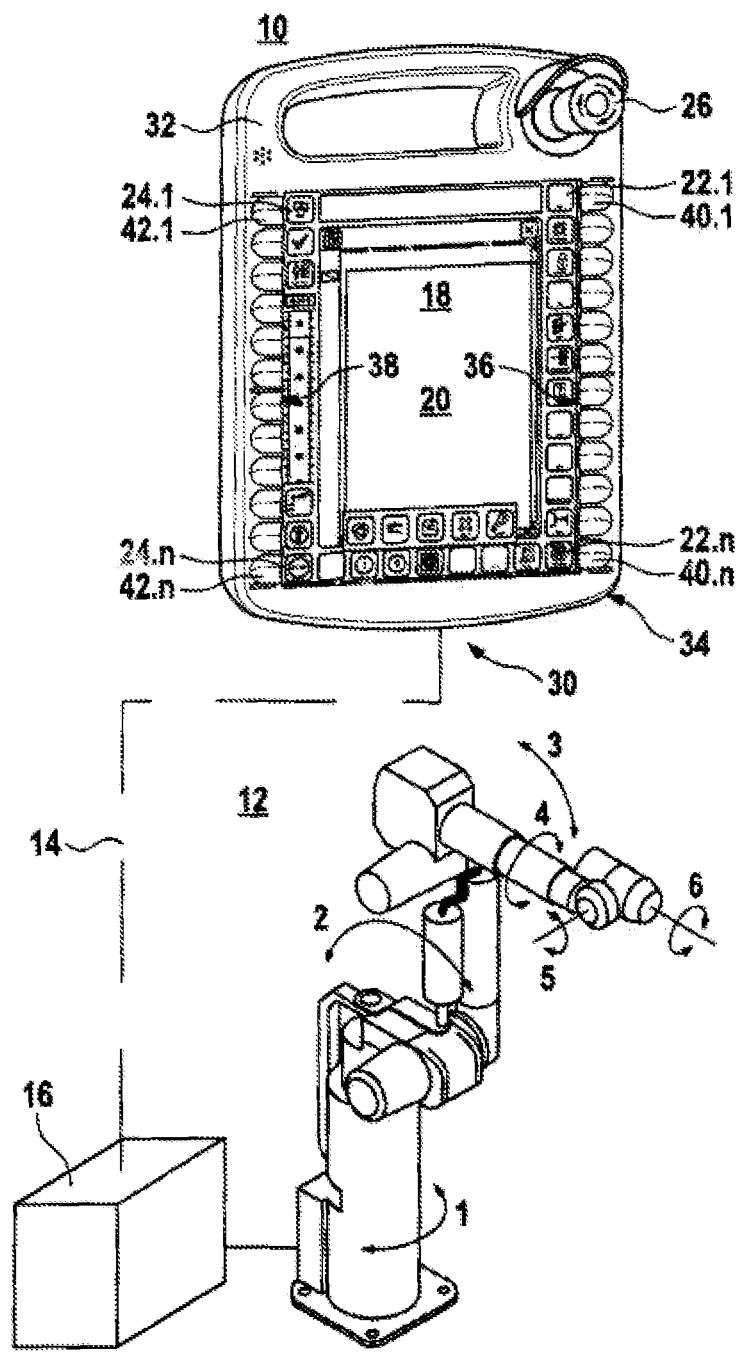

(51) Int. Cl.
*G01B 11/03* (2006.01)
*G05B 19/409* (2006.01)

(52) U.S. Cl.
CPC .............. *G05B 2219/36143* (2013.01); *G05B 2219/36168* (2013.01); *G05B 2219/39438* (2013.01); *G05B 2219/39444* (2013.01); *G05B 2219/39446* (2013.01)

(58) Field of Classification Search
CPC ........... G05B 2219/39443; G05B 2219/39444; G05B 2219/39446; G05B 2219/39466; G05B 2219/40522; G05B 19/409; G05B 2219/35488; G05B 2219/36122; G05B 2219/36136
See application file for complete search history.

(56) References Cited

U.S. PATENT DOCUMENTS

| | | | | |
|---|---|---|---|---|
| 5,937,143 | A * | 8/1999 | Watanabe | B25J 9/1671 700/264 |
| 7,395,606 | B2 * | 7/2008 | Crampton | B25J 13/088 33/503 |
| 7,591,078 | B2 * | 9/2009 | Crampton | B25J 13/088 33/503 |
| 8,195,333 | B2 * | 6/2012 | Ziegler | B25J 5/007 318/568.16 |
| 8,918,213 | B2 * | 12/2014 | Rosenstein | B25J 5/007 700/245 |
| 8,935,006 | B2 * | 1/2015 | Vu | B25J 5/007 700/246 |
| 2005/0166413 | A1 * | 8/2005 | Crampton | B25J 13/088 33/503 |
| 2008/0235970 | A1 * | 10/2008 | Crampton | B25J 13/088 33/503 |
| 2012/0096503 | A1 * | 4/2012 | Slothouber | H04N 21/4126 725/110 |
| 2013/0345874 | A1 * | 12/2013 | Blumberg | B25J 9/0087 700/259 |
| 2013/0345875 | A1 * | 12/2013 | Brooks | B25J 9/0087 700/259 |

FOREIGN PATENT DOCUMENTS

| | | |
|---|---|---|
| DE | 102007018607 A1 | 10/2008 |
| DE | 102010025781 A1 | 1/2012 |
| DE | 102010039540 A1 | 2/2012 |
| JP | 2006142480 A | 6/2006 |

OTHER PUBLICATIONS

International Search Report mailed Sep. 25, 2013, corresponding to International Patent Application PCT/EP2013/064979.
German Office Action dated Nov. 21, 2012, corresponding to German Patent Application No. 102012106448.2.

* cited by examiner

METHOD FOR OPERATING AN INDUSTRIAL ROBOT, AND A SECURE MONITORING DEVICE FOR CARRYING OUT SAID METHOD

This application is a 371 of PCT/EP2013/064979, filed on Jul. 16, 2013, which claims priority to German Application No. 102012106448.2, filed Jul. 17, 2012.

The invention relates to a method for operating an industrial robot connected to a robot control by an operating device comprising a graphic operator interface such as a touch display. Furthermore, the invention relates to a secure monitoring device for enabling and monitoring a function to be carried out by an industrial robot, wherein the secure monitoring device is coupled to a control apparatus that controls the industrial robot and to an operating device for requesting the function to be carried out for the exchange of data.

A device for controlling an industrial robot in the form of a manually operated device is described in DE 10 2010 039 540 A1. The manually operated device can be coupled to a robot control in order to program or control the industrial robot.

The manually operated device comprises an electronic circuitry that comprises a microprocessor in order to be able to communicate with the robot control. Furthermore, the manually operated device comprises a display designed as a touchscreen, an emergency shutdown key and a change-over switch designed as a lock. For the manual moving, e.g., of a robotic arm the manually operated device comprises different input means and processing means that can be manually operated independently of one another and that are designed as a 6-D mouse or as typing keys. There is the possibility, by means of the touchscreen, of associating each processing means with its own reference coordinate system.

However, in the known embodiment the control of the industrial robot takes place exclusively via the manually actuatable input means so that the manually operated device is expensive to manufacture and susceptible in operation.

Another device for operating an industrial robot is described in DE 10 2010 025 781 A1. The manual device in the form of a mobile telephone comprises a touchscreen that serves on the one hand as output means for outputting information from the robot control, in particular for presenting an operating surface and on the other hand as command input means for inputting control commands by keys.

The manual device is detachably fastened to a portable safety device by a clamping device such as is known in principle, for example, for holders for mobile telephones in motor vehicles and is connected to the safety device by a USB interface. The safety input device comprises an emergency stop button, a permission key and a selection switch for the operating mode. This embodiment has the disadvantage that an operator is always forced to look at the touchscreen in order to avoid erroneous inputs for a secure operation of the virtual keys. The same applies in the case of adverse environmental conditions such as, for example, a strong incidence of light or darkness that would render an operation of the touchscreen difficult.

DE 10 2005 040 714 A1 describes a method and a system for setting up a movement course for a robot. The system comprises a robot control that can be connected to an external arrangement, wherein the external arrangement comprises a functional unit designed as a so-called graphical teach pendant unit (GTPU). The functional unit has a monitor on which images of a real work area of a robot can be displayed adjacent to each other that were taken with image registering apparatuses fastened on a hand articulation of the robot from different perspectives. Furthermore, an actuation element in the form of a key is provided on the functional unit. It is provided that a start position of the robot is set with the aid of a setting device. Then, the operator selects a theoretical end position with the aid of the functional unit and the GTPU in that the operator touches an appropriate point on the image displayed on the functional unit with a pencil of the GTPU provided to this end. In particular, the operator touches a point in the area of a joint on both images that is represented on the images. The theoretical end position selected in the images is displayed with the aid of a cross on the monitor of the functional unit so that the operator has a visual confirmation. If the operator agrees with the selection he must confirm this by pressing the activation element before continuing with the next method step. A secure communication between the functional unit and the robot control is not described in DE 10 2005 040 714 A1.

Starting from the above, the present invention has the basic problem of further developing a method and a secure monitoring device of the initially cited type in such a manner that the operation of an industrial robot is simplified and the security of the operation is increased.

The problem is solved, among other things, by a method with the following method steps:

Requesting a desired function or operating mode of the industrial robot by an activation input of at least one preferably virtual operating element by an operator, Registering the activation input of the at least one preferably virtual operating element, transmission of the actuation input to a secure monitoring device for enabling and/or monitoring the function to be carried out by the industrial robot or the operating mode, Identifying graphic information associated with the requested function or operating mode in the secure monitoring device, Coding the graphic information with the random generator such as placing it at a random position in a larger image, and transmitting the coded graphic information from the secure monitoring device to the operating device and the display of the coded graphic information on the graphic operator interface, Registering an activation input of the operator by which the correctness of the displayed, coded graphic information is confirmed, Return of the confirmation input from the operating device to the secure monitoring device and comparison of the received confirmation input with the transmitted, coded graphic information, and Carrying out the requested function or operating mode upon agreement of the confirmation input with the transmitted, coded, graphic information in particular by the robot control.

The method of the invention opens the possibility of controlling an industrial robot or another technical system with elevated security requirements with an operating device that has no electrical operating elements but rather is operated exclusively via a display or a touch display.

Note regarding the coded graphic information that it can also be alphanumeric. Coding also includes a simple changing of the graphic information. Graphic information is to be understood as being general and includes a simple symbol.

Note regarding the touch display that it preferably concerns a touch screen customary in the market with a smooth surface that is preferably designed as a capacitive touch screen although a resistive touch screen can also be considered.

Even functions relative to securing can be initiated by the operating device such as, e.g., the operating mode, for which a hardware key switch is usually required. Since the operating device with a graphic operator interface is constructed only with a single channel in software and hardware, this is considered as an insecure device in the sense of security standards. However, functions can be securely initiated by the method according to the invention.

The direction of action goes from the operator via the operating device to the secure monitoring device, then back to the operator and subsequently back to the secure monitoring device, that finally carries out the secure initiation of the function. A secure initiation of the function is made possible by the active circuit closed by the secure monitoring device. It is possible with the method of the invention to securely initiate any functions, i.e., the method is not limited to the selection of the operating mode.

Consequently, the method according to the invention makes it possible to initiate a function directed to security by an unsecured operating device in combination with a secure monitoring device.

Four method steps are used in the method:

Step 1: Requesting a function by the operator. The operator requests the carrying out of a function directed to security on a device considered as insecure. This request is passed to the secure monitoring device.

Step 2: Confirmation to the operator. The secure monitoring device reports the selection of the function taken on the operating device to the operator.

Step 3: Confirmation by the operator. The operator confirms the correctness of the activated selection of the function to the secure monitoring device.

Step 4: Carrying out the function. After the confirmation and a comparison, preferably in the form of a plausibility check, the secure monitoring device carries out the function.

According to a preferred method of operation it is provided that the at least one operating element is visually represented as a virtual operating element on a display of the graphic operator interface and that upon activation of the virtual operating element a position of the virtual operating element is registered on the display in the form of an X'-, Y'-coordinate.

The X'-, Y'-coordinate can be transmitted to the secure monitoring device and evaluated in it.

Alternatively, there is the possibility that the X'-, Y'-coordinate is evaluated in the operating device, wherein a function or operating mode corresponding to the X'-, Y'-coordinate is identified and that a function recognition such as a function name or function number is transmitted to the secure monitoring device.

At least one virtual operating element is visually shown on the display of an operating device. This operating element represents a security function to be initiated. The operating element can be selected by a selection device in order to select a security function linked to it. A possible selection device can be, e.g., an indicator control device such as a PC mouse or a finger that touches a touch display.

A selection position either of a click position of the indicator control of a typing position of the finger on the touch display is transmitted in the form of X'-, Y'-coordinates to the secure monitoring device, that understands the request to initiate a secure function. The secure monitoring device recognises, based on a previously made assignment, which security function is associated with the particular X'-, Y'-coordinates and can therefore unambiguously identify the function requested by the operator.

It is provided to this end that each function or operating mode is provided with a corresponding function icon in a secure memory of the secure monitoring device, that an X'-, Y'-coordinate or a function identification is associated with each function icon, that the function icon is identified by the X'-, Y'-coordinates received by the operating device or by the signal of the signal generator, and that the function icon is transmitted from the secure monitoring device to the operating device and displayed on the graphical operating interface. A function request to be carried out is on the secure monitoring device independently of the operating element used. Since this inquiry stems from an unreliable, i.e., insecure source and confirm execution of the function. To this end the secure monitoring device sends the selected function in an iconized form back to the operating surface. As a result of the confirmation of the selected function, it is possible for the operator to visually recognize any erroneous inputs, erroneous interpretations by the software or transmission errors on the stretch between the operating device and the secure monitoring device. In the case of an error the operator can abort the procedure and carry out the function requests again. The iconized representation makes it possible for the operator to identify the secure transmission device as data source since the iconized representation is only filed there in the form, e.g., of a function icon. A falsification of data on the transmission path from the secure transmission device to the operating device would immediately be recognizable as an image error.

According to a preferred method of procedure a separate function icon that is present in a customary data format, e.g., as a bitmap file, is stored in the secure memory for each function to be executed. The association of the function icon with the corresponding functions must be made known previously to the secure monitoring device by a configuration procedure. A function icon is removed from the memory that fits the selected function, sent to the operating device such as tunneled and displayed on the operating device. Tunneled means in this instance that the data is transmitted non-falsified and without further data processing from the secure monitoring device to the operating device.

The function icon preferably represents the selected function in graphic form as an image and/or text so that the operator can readily recognize the function shown.

Another preferred method of procedure provides that the secure monitoring device generates an at least single-digit random number by a random generator, wherein the random number is stored.

The random number is preferably iconized and transmitted as a numeric code in the form of a number icon together with the function icon as coded, graphic information to the display on the graphic operator interface. Therefore, the code falsification can be immediately recognized, e.g., by the transmission path by the coded such as iconized representation.

Another method step is distinguished in that the confirmation input of the operator comprises the input of a numerical sequence given by the iconized numeric code via an input unit such as a numeric keyboard of the graphic operator interface, wherein the input of the numerical sequence is preferably registered by touching virtual keys of the numeric keyboard displayed on a touch display.

The operator must therefore cognitively recognize the function shown in an iconized manner. If the shown function corresponds to its previously set selection, the operator can confirm this by inputting the confirmation code, that is also shown in an iconized manner. To this end the operator must cognitively recognize the iconized confirmation code and input it as a numerical sequence via a keyboard. The indicated numeric code is subsequently transmitted to the secure monitoring device for checking.

The iconized representation of the confirmation code is only machine-readable with significant algorithmic complexity. On the other hand, an operator can readily identify the iconized confirmation code by his cognitive capacities and convert them into a machine-readable numeric sequence by typing in the recognized numeric sequence. It can be prevented by the iconized representation that, e.g., the operator surface directly sends the code obtained from the secure monitoring device back to the secure monitoring device and therefore automatically executes an undesired confirmation. On the other hand, an operator is always required for recognizing the confirmation code represented in an iconized manner.

An alternative method provides that the function icon is positioned on a display position determined by the secure monitoring device in an image and the image is transmitted as coded, graphic information to the graphic operator interface and displayed on the display.

It is preferably provided here that the image in the secure memory of the secure monitoring device with empty image content is stored in a data format corresponding to the data format of the function icon and that the image with empty image content is used as an image frame for representing the at least one function icon.

The function icon is preferably removed from the secure memory according to the selected function or operating mode and copied into the image at a randomly selected U-/V-position.

The selected U-/V-position is determined by the random generator and is known only to the secure monitoring device.

Finally, the generated image is sent in its entirety to the operating device and displayed on the display at a defined position.

In order to confirm the input, it is provided that the X-, Y-coordinate of the selection point is registered, sent to the secure monitoring device and that the X-, Y-coordinate is compared to the U-V position of the function icon in the image and that then, if the coordinates coincide within a defined tolerance, the requested function or operating mode is executed.

It is provided as a supplementary measure for increasing the reliability that the activation of the function icon is linked to a defined gesture, wherein after the activation of the function icon, i.e., when the mouse key is pressed or when the finger contact on the touch display is held down with the selection device such as mouse or finger a movement, a movement must take place such as dragging in a defined direction, a linear movement or circular movement.

The problem is also solved by a method with the following method steps:

Display of at least one virtual operating element on the touch display which element represents a function or operating mode of the industrial robot, Selection of a desired function or operating mode by activating the at least one virtual operating element by an operator, Registration of the activation of the at least one virtual operating element and emitting a control signal corresponding to the selected function or operating mode to a reliable monitoring device, Evaluation of the control signal in the secure monitoring device and selection of graphic information associated with the selected function or operating mode, Generation of an image in which the graphic information is positioned at a display position determined by the secure monitoring device, Transmission of the image to the operating device and display of the image with the graphic information on the touch display, Registration of a touch position upon the touching of the displayed graphic information by the user, Sending the touch position back to the security control, Comparison of the received touch position with the given display position, and Execution of the selected function or operating mode if the touch position agrees with the display position preferably within a defined tolerance.

A preferred method of procedure is distinguished in that the display position in which the graphic information is displayed inside the image is randomly determined. The transmission of the image with integrated graphic information takes place as an image file such as a bitmap from the secure monitoring device to the operating device and is then displayed on the touch display in a position given by the secure monitoring device or known to the secure monitoring device.

A virtual operating element corresponding to the function or the operating mode is preferably displayed as graphic information or a numeric code is visually shown.

According to a preferred method the graphic information is stored preferably with two channels in a memory of the secure monitoring device with secure technology. Even the evaluation of the control signal takes place in the secure monitoring device with secure technology, preferably in two channels.

According to another preferred embodiment of the method it is provided that the touching of the virtual operating element on the surface of the touch display is registered by determining a first coordinate of a touch point and that an initiation of the function of the virtual operating element takes place when the first coordinate of the touch point leaves, after a lasting contact with the surface of the touch display, a given coordinate range by a manual action of the operator.

The manual action can be initiated here by a gesture of the operator. The gesture can be executed by the dragging of a finger of the operator on the touch display into the or out of the given coordinate range. The gesture is preferably made in a defined direction, wherein the sensitivity to the finger movement, the intensity of the gesture can be infinitely adjusted in order to initiate an action.

Furthermore, the invention relates to a specific inventive method for operating an industrial robot with a manual device. It is provided that the initiation of a touch function requires a manual action of the operator on the touch display. In order to prevent an unintended initiation of virtual operating elements by inadvertent touching, a function is not initiated until a special "small gesture" is made after the touching of the touch display, e.g., dragging the finger in a defined direction. This results in a reliable touch.

The gesture required for initiating a function, that is, that the required intensity or type of gesture can be infinitely adjusted: It extends from a simple finger contact, a generally customary operation of the touch display, to a defined gesture. As a result of haptic marks such as the special shaping of the finger troughs at the display edge, the finger can slide in continuation of the finger troughs onto the touch display, initiating a function. If the operator notices that he introduced an undesired initiation of a function, he can cancel the initiation of the function by dragging his finger back into the original position.

The device according to the invention is distinguished over the prior art in particular in that the number of hardware components is reduced to an absolute minimum. All operating functions are consequently realized in touch software with the exception of the security-directed switch "emergency stop" and "permission". No other electrical components such as membrane keys, switches or signal lights are necessary. As a result, the system is low-maintenance.

The gain in space favors a large, comfortable touch display. The virtual operating element and displays shown on the touch display are designed for industrial use and are shown in a contrast-rich and large manner so that a reliable operation is possible.

The invention furthermore relates to a secure monitoring device for the enabling and monitoring of a function to be performed by an industrial robot, wherein the secure monitoring device is coupled to a control device controlling the industrial robot and to an operating device for requesting the function to be performed for the exchange of data.

According to the invention, the secure monitoring device comprises

An evaluation and identification device for evaluating the requesting of functions and the identification of graphic information corresponding to the function, A coding device for coding the graphic information, A transmission device for transmitting the coded, graphic information to a graphical user interface of the operating device, A receiving and comparing device for receiving a confirmation input from the operating device and for comparing the confirmation input with the coded graphic information.

A preferred embodiment is distinguished in that the secure monitoring device comprises a secure, preferably two-channel memory in which the at least one piece of graphic information is stored as a function icon.

In order to generate a coded or iconized representation, it is provided that the coding device comprises an image generating device with which the function icon is copied into an image with empty image content stored in the memory at a random U-/V position.

In order to achieve a suitable coding, it is provided that the image generating device comprises a random generator with which the U-/V position is generated.

The coding device is preferably coupled to the comparison device in order to compare the transmitted, coded information with the received, inputted information.

According to another embodiment it is provided that the coding device comprises a for generating a random number and comprises an iconizing device for generating a numeric icon from the random number.

In order to carry out or enable the requested function, it is provided that the comparison device is coupled to a secure output.

Other details, advantages and features of the invention result not only from the claims, the features to be gathered from them alone and/or in combination but also from the following description of exemplary embodiments to be gathered from the drawings.

Figure 2:
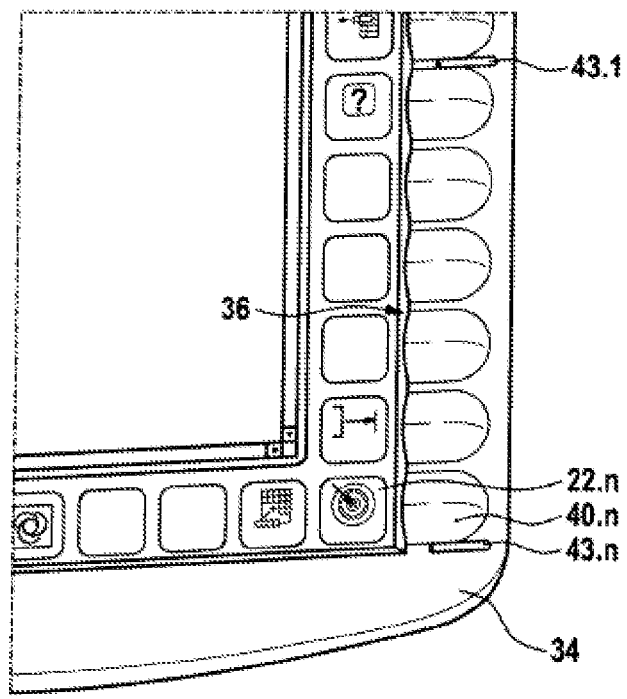
Figure 3:
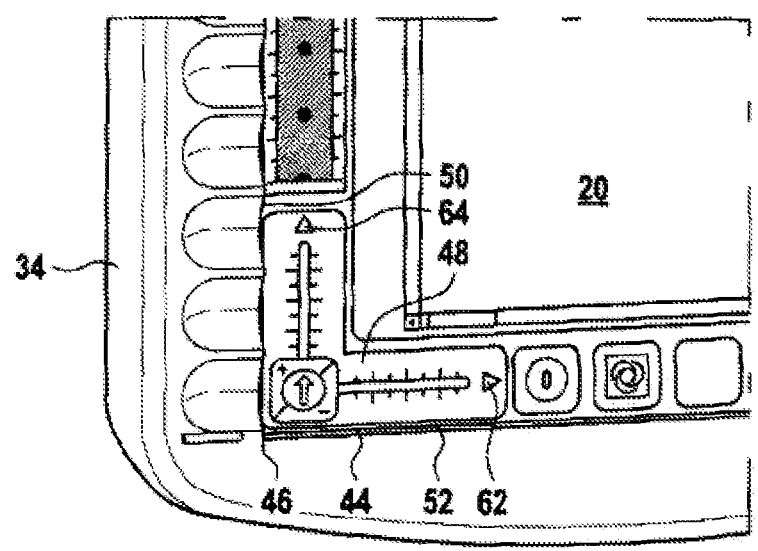
Figure 4:
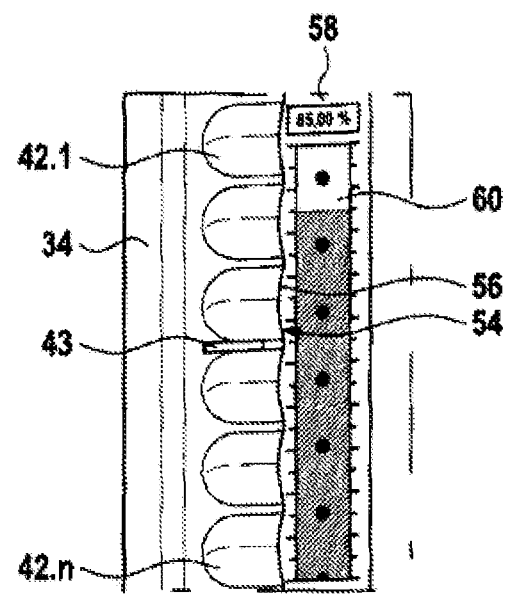
Figure 5:
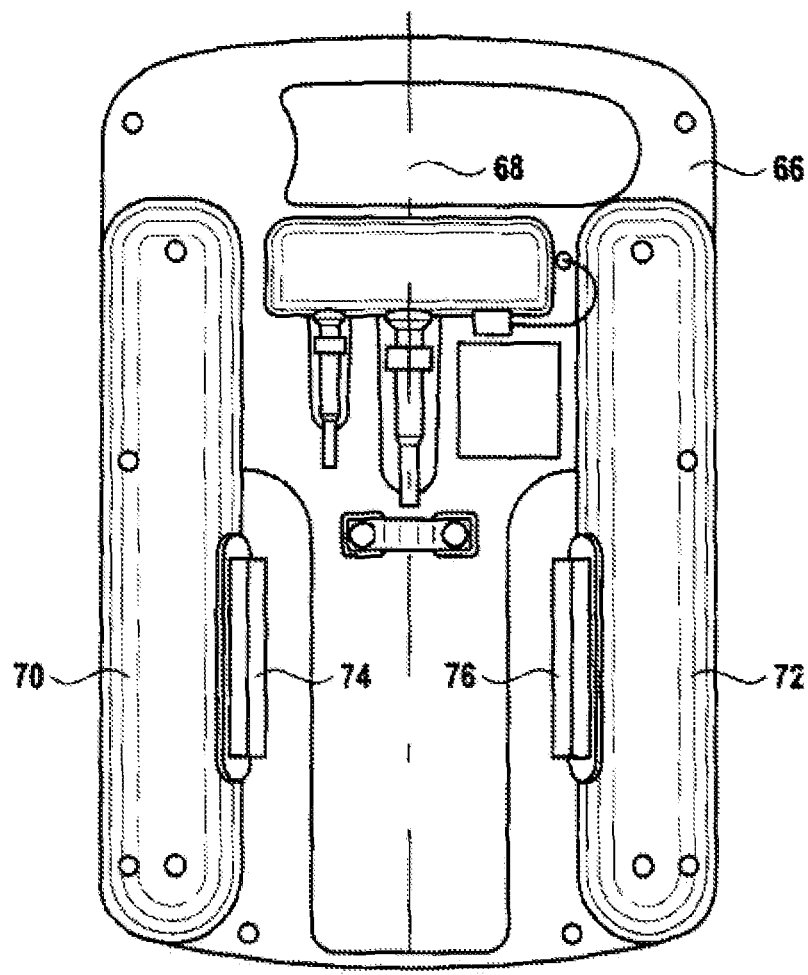
Figure 6:
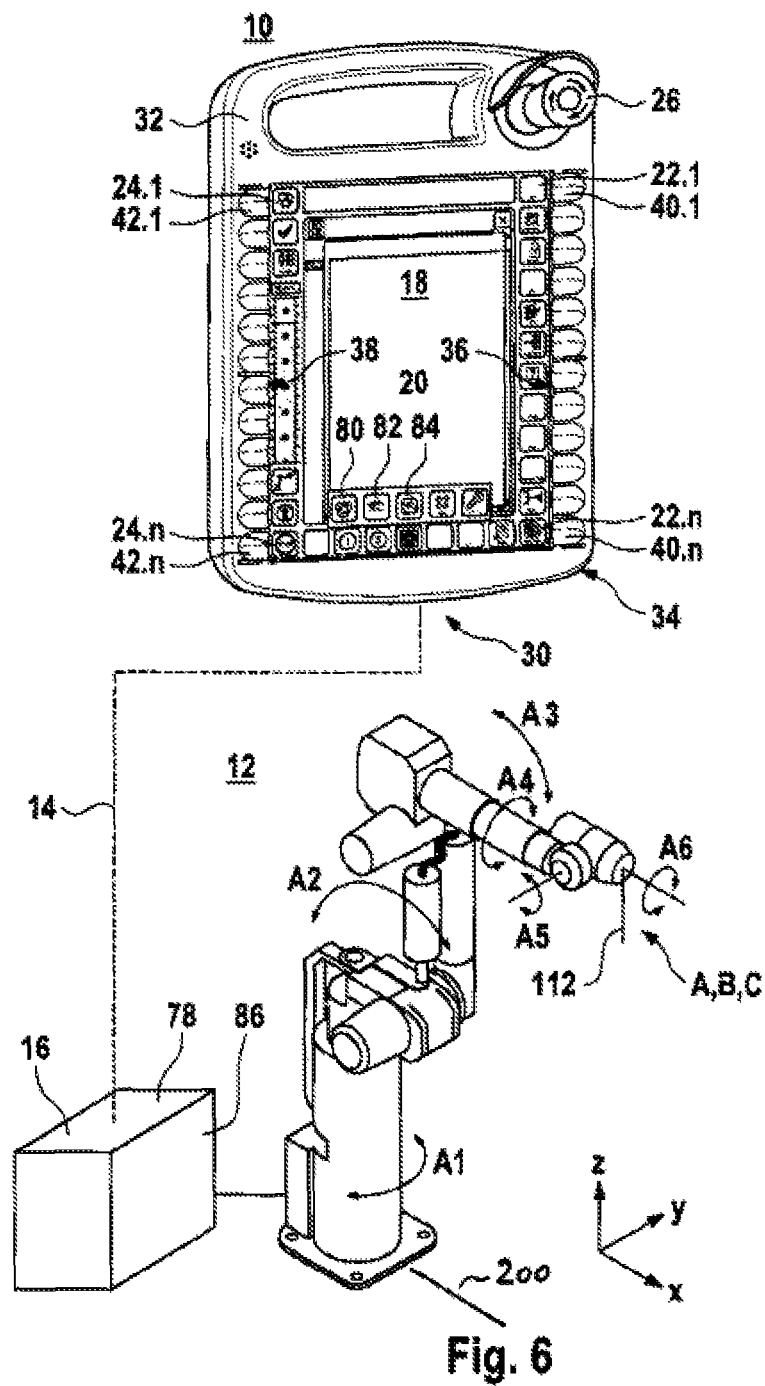
Figure 7:
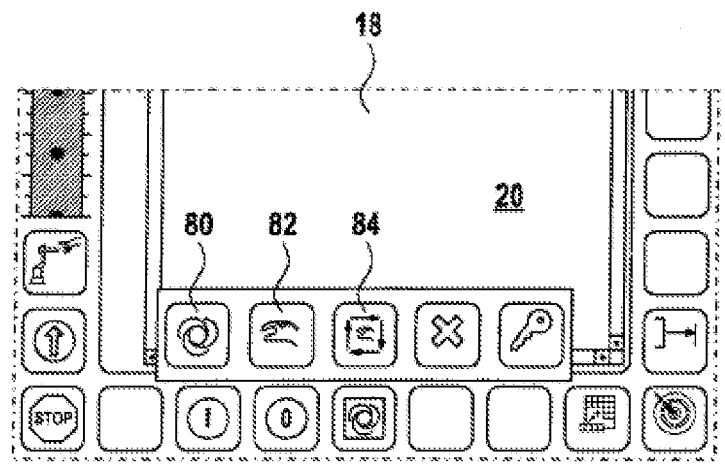
Figure 8:
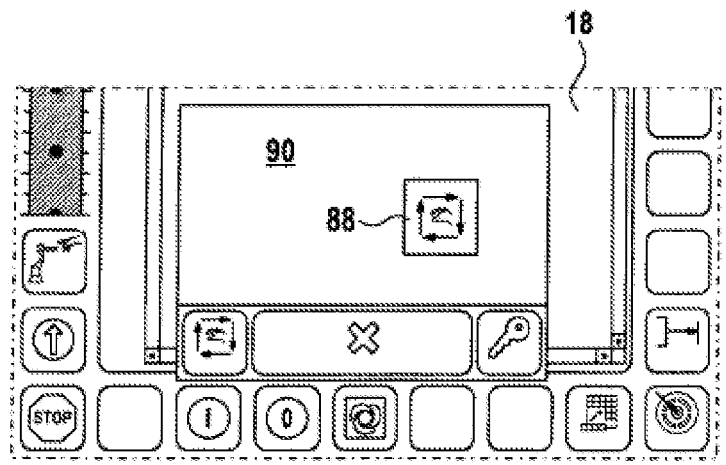
Figure 9:
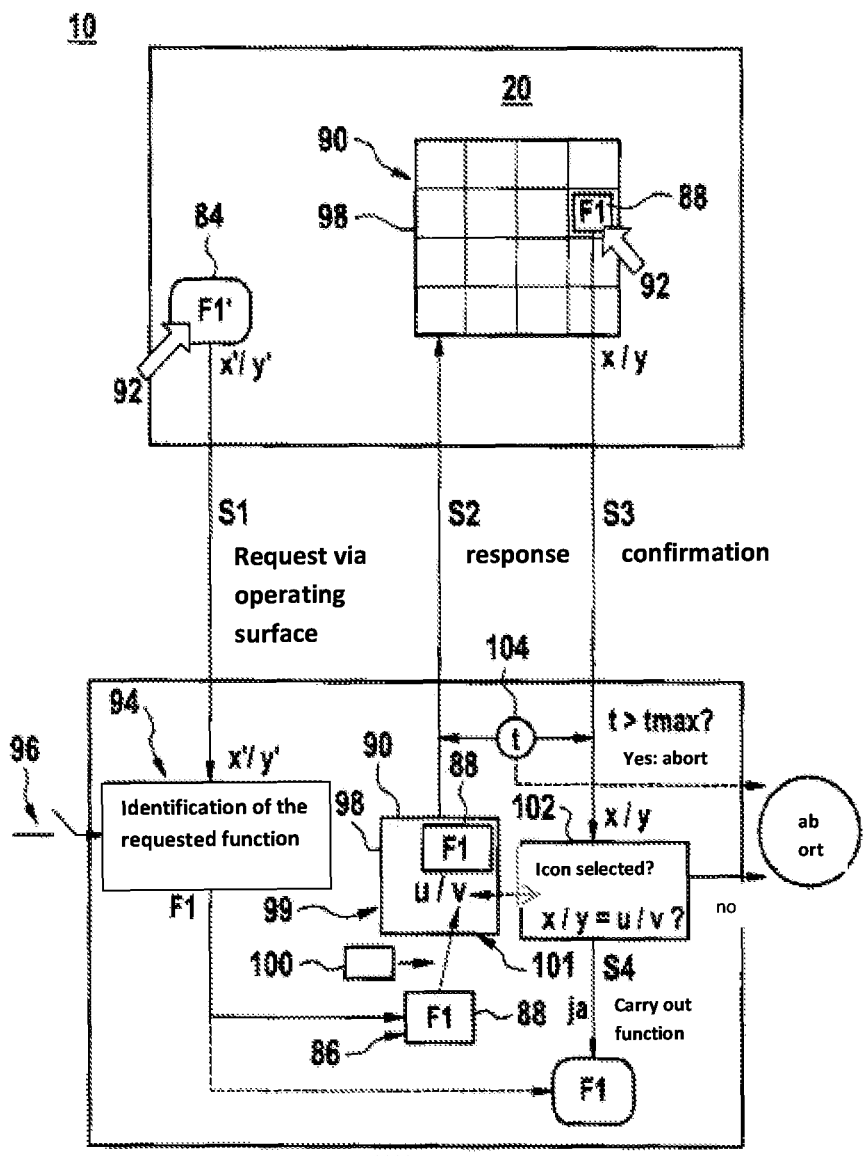
Figure 10:
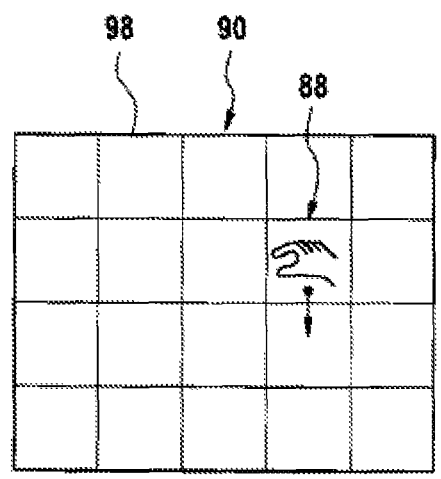
Figure 11:
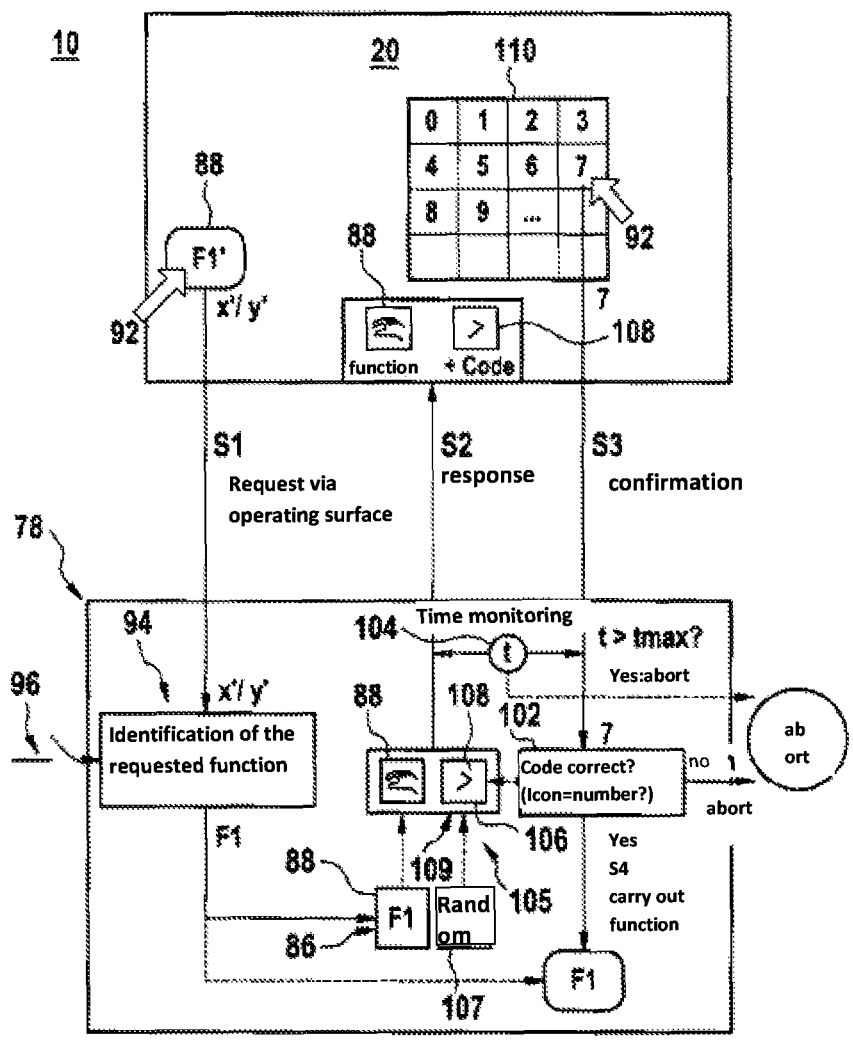
Figure 12:
Figure 13:
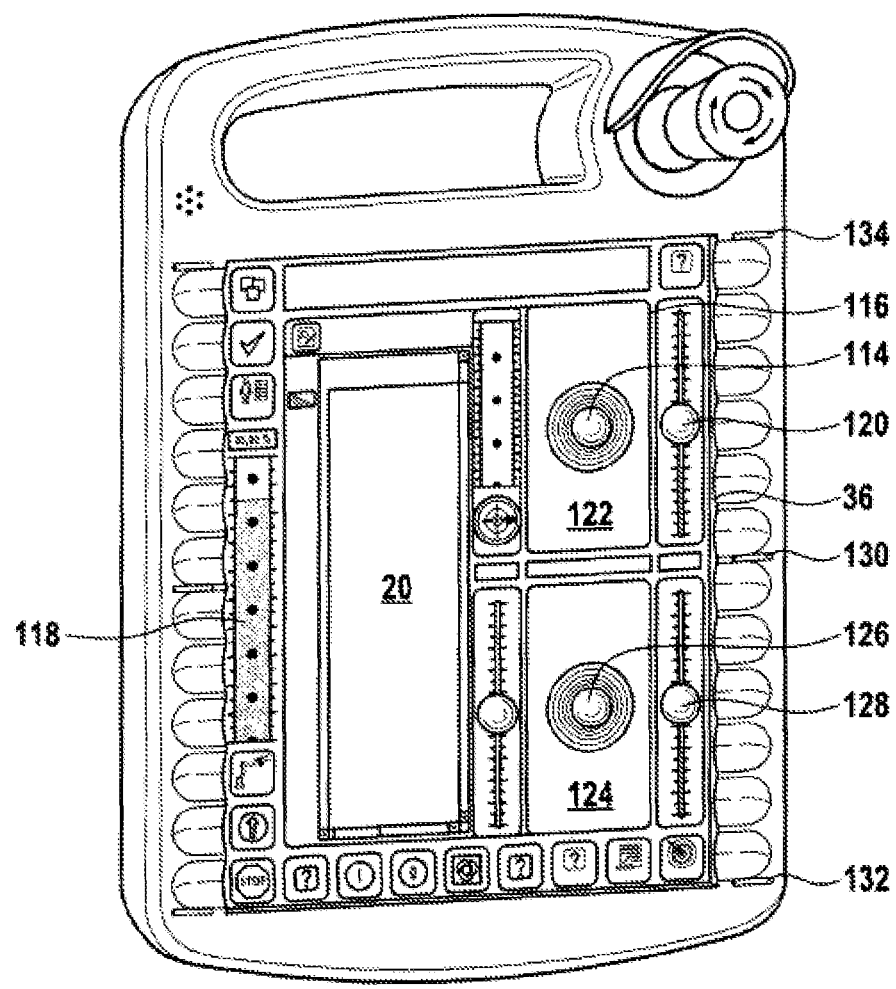
Figure 14:
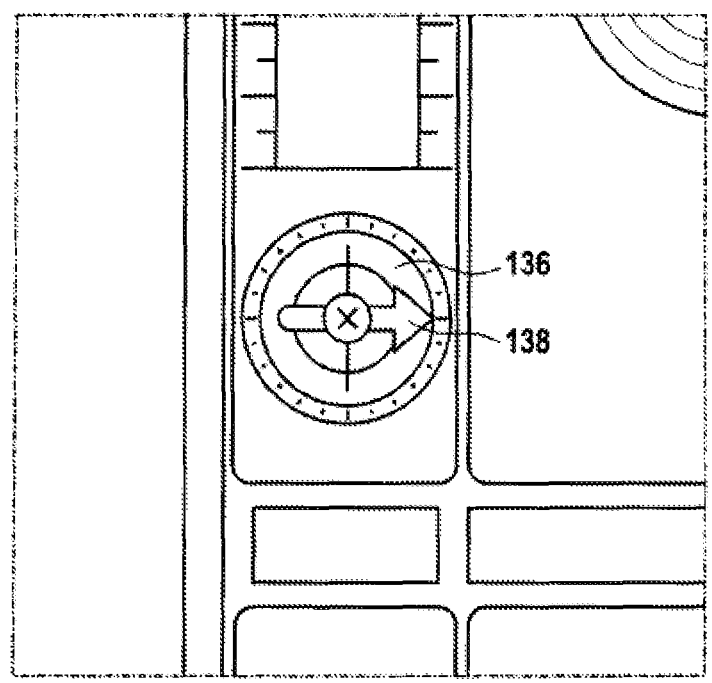

In the drawings:

FIG. 1 shows a manual programming device for operating an industrial robot,

FIG. 2 shows a section of a display frame of the manual programming device which frame borders the touch display, FIG. 3 shows a second section of a display frame which borders the touch display, FIG. 4 shows a third section of a display frame which borders the touch display, FIG. 5 shows a rear view of the manual programming device, FIG. 6 shows a schematic method for operating an industrial robot with an operating device, FIG. 7 shows a section of an operating surface of the operating device with virtual operating elements, FIG. 8 shows a section of an operating surface of the operating device with an image with graphic information, FIG. 9 shows a schematic view of a first embodiment of a communication between the operating device and a secure monitoring device, FIG. 10 shows a schematic view of a virtual operating element with gesture function represented in an image, FIG. 11 shows a schematic view of a second embodiment of a communication between the operating device and the secure monitoring device, FIG. 12 shows an iconized view of a numeric code, FIG. 13 shows an operating surface of the operating device with different process areas, and FIG. 14 shows a virtual operating element for recalibrating the coordinate system of the operating device.

FIG. 1 shows a device 10 in the form of a manual programming device for operating an industrial robot 12. To this end the manual device 10 is connected via a wireless or wire-connected communication connection 14 to a robot control 16. The manual device 10 comprises a graphic operator interface 18 with a touch-sensitive display 20 called a touch display in the following. The touch display 20 serves to display at least one virtual operating element 22.1 . . . 22.$n$, 24.1 . . . 24.$n$ that represents a function for controlling, programming or operating the industrial robot 12, wherein when the virtual operating element 22.1 . . . 22.$n$, 24.1 . . . 24.$n$ is touched with a finger of an operator the associated function is initiated.

Furthermore, the manual device 10 comprises a control unit 30 for controlling the graphic operator interface 18 and for communicating with the robot control 16 and comprises a position sensor for determining the position and inclination of the operating device.

The graphic operator interface 18 with the touch display 20 is arranged together with the control unit 30 in a housing 32. The housing 32 forms a display frame 34 surrounding the touch display 20 on its edge. Furthermore, a security-directed emergency stop switch 26 is arranged on an upper side of the housing 32.

The virtual operating elements 22.1 . . . 22.$n$ and 24.1 . . . 24.$n$ are arranged along a frame section 36, 38 of the display frame and bordering on the touch display 20. In order to make possible a blind operation of the virtual operating elements 22.1 . . . 22.$n$ and 24.1 . . . 24.$n$, according to a first independent concept of the invention haptic marks 40.1 . . . 40.$n$ and 42.1 . . . 42.$n$ are arranged in the frame section 36, 38. Each haptic mark 40.1 . . . 40.$n$, 42.1 . . . 42.$n$ is associated with virtual operating element 22.1 . . . 22.$n$, 24.1 . . . 24.$n$.

In particular, the virtual operating element 22.1 . . . 22.$n$, 24.1 . . . 24.$n$ is directly adjacent to the haptic mark 40.1 . . . 40.$n$ and 42.1 . . . 42.$n$ so that a direct transition from the haptic mark 40.1 . . . 40.$n$ and 42.1 . . . 42.$n$ to the virtual operating element 22.1 . . . 22.$n$, 24.1 . . . 24.$n$ takes place. Therefore, a finger guided along a haptic mark 40.1 . . . 40.$n$ and 42.1 . . . 42.*n* to the virtual operating element 22.1 . . . 22.*n*, 24.1 . . . 24.*n* is guided quasi in one stroke. This avoids or minimizes erroneous operations: First touch, then initiate. Furthermore, it is not necessary that the touch screen, that is, the display 20 has to be specially shaped. In particular and in deviation from the prior art, it is not necessary that materials specially superposed on the display are attached, which otherwise produces losses of transparency.

The haptic marks 40.1 . . . 40.*n* and 42.1 . . . 42.*n* form a guide by which a finger of an operator is guided to the associated virtual operating element 22.1 . . . 22.*n*, 24.1 . . . 24.*n*.

FIG. 2 shows an enlarged view of the operating elements 22.1 . . . 22.*n* and the haptic marks 40.1 . . . 40.*n* associated with them.

A reliable operation of the virtual operating elements is ensured by the arrangement of the virtual operating elements 22.1 . . . 22.*n* and 24.1 . . . 24.*n* along the frame sections 36, 38 comprising the haptic marks 40.1 . . . 40.*n*, 42.1 . . . 42.*n*. The offset and specially shaped frame section 36, 38 serves for the tactile orientation of the touch display 20.

In the exemplary embodiment shown in FIG. 1 and FIG. 2 the haptic marks 40.1 . . . 40.*n*, 42.1 . . . 42.*n* are formed as finger troughs that are shaped in such a manner that then can be reliably touched with the fingers and ensure a guide for the finger from the frame sections 36, 38 in the direction of the associated virtual operating element 22.1 . . . 22.*n* and 24.1 . . . 24.*n*.

Furthermore, haptic marks 43.1 . . . 43.*n* are provided that are formed as nubs and are arranged on a surface of the display frame 34.

As a consequence, on the one hand the basically lacking haptic of a touch display 20 is compensated and on the other hand the operator can direct his visual attention to the industrial robot and the process without having to look at the manual operating device or manual device 10, which on the whole increases the operating safety. A "blind operation" is made possible.

FIG. 3 shows an embodiment of a haptic mark 44 as a frame corner 46 of the display frame 34 and bordering on the touch display 20. An unambiguous, exact position on the touch display 20 is defined by the frame corner 46 of the display frame 34. A virtual operating element 48 is provided on the touch display 20 at these selected positions and is moved, for example, in a linear direction along a frame section 50 on the display side or along the other frame section 52 of the frame corner 46 and on the display side.

FIG. 4 shows another embodiment of a haptic mark 54 that is constructed as a frame section 56 of the display frame 34 and on the display side. The finger of an operator can make a shifting motion along the frame section 56 via which a virtual slide element 60 running along the frame section 56 can be adjusted.

The haptic marks 40.1 . . . 40.*n*, 42.1 . . . 42.*n* shown in FIGS. 1 and 2 and constructed as finger troughs form a haptic orientation on the display edge with high resolution, e.g., for feeling positions of the virtual operating elements 22.1 . . . 22.*n*, 24.1 . . . 24.*n* since they are arranged directly adjacent to the finger troughs. Each finger trough can be unambiguously associated with a virtual operating element. The finger troughs 40.1 . . . 40.*n*, 42.1 . . . 42.*n* are constructed to be half open and open in the direction of the touch display 20 so that a finger guided as in a groove can slide on the touch display and initiate a function of the virtual operating element 22.1 . . . 22.*n*, 24.1 . . . 24.*n* there.

According to a specific concept of the invention, it is provided that the initiation of a function associated with the virtual operating element 22.1 . . . 22.*n*, 24.1 . . . 24.*n* requires a manual action of the operator on the touch display 20. In order to prevent an unintended initiation of the virtual operating elements 22.1 . . . 22.*n*, 24.1 . . . 24.*n* by an inadvertent touching, a function is not initiated until a predefined gesture such as, for example, dragging the finger in a defined direction is made after touching the touch display 20. The sensitivity of the reaction to the finger movement can be infinitely adjusted by a regulator. Therefore, the intensity of the required gesture for initiating functions can be infinitely adjusted. It extends from a simple finger contact, generally customary operation of the touch display 20, up to a special, small gesture. As a result of the special shaping of the finger troughs 22.1 . . . 22.*n*, 24.1 . . . 24.*n* in the frame section 36, 38 of the display frame, the finger can slide in the continuation of the finger troughs on the touch display, initiating a function. If the operator notices that he introduced an undesired initiation of a function, he can cancel the initiation of the function by dragging his finger back into the original position.

As soon as the operator, starting from the finger trough 40.*n*, touches the virtual operating elements 22.*n* with his finger, a corresponding coordinate on the touch display is registered by the control unit 30. The associated function is not initiated until, corresponding to the definition of a preset gesture, the finger of the operating person leaves a given coordinate range or reaches a predefined coordinate range. When the virtual operating element has been deflected and is therefore ready for initiation (initiation takes place when the finger is raised), this is characterized by an optical recognition, e.g., by a colored edging on the operating element. If an unintended deflection is made retrograde in that the operating element is drawn back into the origin, this is made known by the disappearance of this optical characteristic.

According to another specific inventive embodiment of the invention, the virtual operating elements 48 placed, e.g., in the frame corner 46 of the display frame 34 are linked to a special gesture control. They are shifted, e.g., along the frame sections 50, 52 in two directions 62, 64, as is shown in FIG. 3. A selectable function is associated with each direction of movement 62, 64. Therefore, it is, e.g., possible to activate a function "A" when moving along the frame section 52 and a function "B" when moving along the frame section 50. The degree of deflection is evaluated here, wherein two evaluation possibilities are provided.

According to a first evaluation possibility the degree of deflection is passed immediately as an analog parameter such as an indication of speed to the function. If the finger is let go in the deflected position, the analogous value jumps immediately to zero. If the finger is guided in a sliding manner back into the initial position, the parameter is reset to zero analogously to the deflection. This function can be used in order, e.g., to start a movement program in positive or negative directions and to vary the speed infinitely.

According to a second evaluation possibility, it is provided that when a definable threshold value is exceeded, a switching function is initiated. The activation of the function does not take place until the finger in deflected position leaves the touch display 20. However, if the finger is guided back into the zero position without being removed from the frame sections 50, 52, the initiation of the function is suppressed.

Another specific inventive concept of the invention relates to the realizing of a so-called override function (speed regulator) that is realized by the sliding operating element 60 shown in FIG. 4. To this end the sliding operating element 60 is placed adjacent to the frame section 56 and centrally to the haptic mark 43. The position of the sliding operating element 60 can be sensed with the aid of the haptic mark 43 and adjusted by shifting the finger along the housing edge 56. The blind adjustment is additionally supported by the haptic marks 42.1 . . . 42.n of the frame sections 38, 56. The so-called override can be adjusted by a shifting between two haptic marks by a defined amount, e.g., 20%. Even other analogous magnitudes such as process parameters can be adjusted in blind operation by the slide operating element 60 arranged on the edge side.

Another specific inventive feature relates to the symmetrical arrangement of the haptic marks 40.1 . . . 40.n, 42.1 . . . 42.n relative to the longitudinal- and transverse central axis of the touch display 20. The longitudinal central axis is the straight line running centrally and parallel to the longer longitudinal frame shanks of the display frame 34. The transversal central axis runs vertically to it, therefore, centrally between and parallel to the shorter transversal shanks of the display frame 34. This ensures that the manual device 10 is suited for right-hand operation as well as left-hand operation. This is achieved in particular by the consequent keyless design of the graphic operator interface and by the symmetric arrangement of the haptic marks. Therefore, the graphic operator interface can be switched by a simple setup function from right-hand operation to left-hand operation, wherein all positions of the virtual operating elements 22.1 . . . 22.n, 24.1 . . . 24.n are mirrored on the longitudinal central axis of the touch display 20.

FIG. 5 shows a back side 66 of the housing 32. Placed holding strips 70, 72 are arranged on the back side 66 symmetrically to the longitudinal axis 68, on which strips the manual device 10 can be securely held with one or both hands. The holding strips 70, 72 can have an outer geometry that corresponds to cylindrical sections, wherein the holding strips 70, 72 should emanate from the outer edge, therefore, from the longitudinal edges of the display frame 34. A permission switch or permission key 74, 76 is integrated in each holding strip 70, 72 of which keys one must be selectively activated for the mobile enabling of the industrial robot.

This symmetrical arrangement prevents the hands from becoming tired since the permission switches 74, 76 can be alternately actuated with the left or the right hand. If a hand becomes tired, the other hand can assume the permission without this interrupting the mobile enabling of the movement of the robot.

Another specific inventive embodiment of the invention is distinguished in that a previously customary key switch for the selection of the operating modes of the robot "setup", "automatic", automatic test" is replaced by a software function. The particularity resides, among other things, in the data processing in secure technology. The touch display 20 is in principle a single-channel one and is therefore an insecure device. A secure functionality of the software is ensured with the aid of a security control 78 integrated in the robotic control 16 according to FIG. 6, called secure monitoring device 78 in the following. The secure monitoring device 78 is described in the European patent application 1 035 953, whose disclosure is included in its entirety in the present application. However, the teaching according to the invention is not limited to a security control corresponding to the European patent application 1 035 953.

Various operating mode options in the form of virtual operating surfaces 80, 82, 84 such as soft keys are presented for selection on the touch display 20 by the operating surface 18, as shown in FIG. 7. The operator selects a new operating mode "X" by touching one of these soft keys 80, 82, 84. The newly selected operating mode is transmitted as the command "request new operating mode X" to the secure monitoring device 78 by the software of the operating surface. The secure monitoring device 78 removes graphic information corresponding to this operating mode such as icon 88 out of its memory 86 and places it at a randomly determined display position in a larger image 90. The position of the icon 88 in the image 90 is known only to the secure monitoring device 78. This image 90 is sent as an image file such as a bitmap to the operating surface 18 and displayed there in a defined position, as is shown in FIG. 8.

The operator must confirm the operating mode recognized by the secure monitoring device 78 by a fingertip on the shown icon 88. A touching position on the touch display is registered in the form of touch coordinates X/Y and returned to the secure monitoring device 78 that compares the touching position with the display position of the icon 88 in the image 90. The comparison takes place taking into account the known position of the image 90 on the touch display 20 and the known, random display position of the icon inside the image 90. If both positions are the same (within a defined tolerance), the introduced change of operating mode is executed. Otherwise the change of operating mode is rejected and the previous operating mode is retained.

A secure active circuit between the operator and the secure monitoring device 78 is produced by this method:
  The operator selects an operating mode,
  The secure monitoring device 78 displays the recognized operating mode on the operating device 10,
  The operator confirms the correctness of the displayed operating mode to the secure monitoring device 78,
  The secure monitoring device 78 engages the new operating mode.

A first alternative of the method and the secure monitoring device 78 are explained in the following with reference made to FIG. 9. The virtual operating element 84 is represented visually in a defined X'-, Y'-position on the touch display 20 of the operating device 10. The virtual operating element 84 represents a security function F1 to be initiated and can be selected by a selection device 92 such as an indicator control in the form of a PC mouse or joystick on a display or by a finger 92 on the touch display 20 in order to select in this manner a security function F1 linked to the virtual operating element 84.

When the virtual operating element 84 is activated by the finger 92 of the operator, a selection position, i.e., the touch position on the touch display 20 in the form of an X'-, Y'-coordinate is registered and transmitted in method step S1 to the secure monitoring device 78. The reception of an X'-, Y'-coordinate is understood as a request to carry out a secure function. The secure monitoring device 78 comprises an evaluation and identification device 94' coupled to the secure memory 86. In the memory 86 a security function or operating mode is associated with each X'-, Y'-coordinate of a virtual operating element 88. As a result of the association stored in the secure memory 86 the secure monitoring device 78 recognizes which security function is associated with the particular X'-, Y'-coordinates and can therefore unambiguously identify the function or operating mode requested by the operator. Alternatively, the operating device itself can carry out a pre-evaluation of the X'-, Y'-coordinates and identify a corresponding function or operating mode that is then sent as a function characteristic such as, e.g., a function name or function number to the secure monitoring device and evaluated.

Optionally, a request for a function implementation can also be generated independently of the operating device 10, wherein the other operating element is constructed as a signal generator 96 such as a key switch or key connected to the secure monitoring device 78.

The secure monitoring device 78 receives a function request to implement a function or operating mode independently of the type of the operating element which function or operating mode is evaluated in the evaluation and identification device 94.

To this end a corresponding function icon 88 in a data format such as a bitmap file is stored in the secure memory 86 of the secure monitoring device 78 for each function to be implemented. The association of the function icon to the corresponding functions takes place via a configuration process.

Independently of the above, the image 90 with empty image content is stored in the secure memory 86 of the secure monitoring device 78. The image 90 is stored in the same data format as the function icon 88 and serves as an image frame 98 for the representation of the function icon 88. The function icon 88 is placed as desired inside the image frame 98 in a coding device 99 by an image generating device 101. Corresponding to the selected function, a function icon 88 filed in the secure memory 86 is removed and copied to a randomly selected U-/V position in the image frame 98. The U-/V position is determined by a random generator 100 and is known only to the secure monitoring device 78. The function icon 88 ideally represents the selected function in graphic form so that the function can be readily identified by the operator. The image 90 with frame 98 and function icon 88 is now transmitted in method step S2 as coded, graphic information as a unit to the operating device such as tunneled and displayed on the display 20. Tunneled means in this case that the data is transferred uncorrupted and without other data processing from the transmitter to the receiver.

The operator must now cognitively recognize the function represented iconized by the function icon 88. If the represented function corresponds to a previously made selection, this can be confirmed by activating or selecting the represented function icon 88.

The selection or activation of the function icon 88, that is represented at a random position in the image frame 98 of the image 90, is comparable to the inputting of a single-digit activation code. Upon activation of the displayed function icon 88 on the touch display 20, X-, Y-coordinates of the activation point are registered and transmitted to the secure monitoring device 78 in method step S3 for checking.

The random position of the function icon 88 can be machine-recognized only with the aid of image processing algorithms. On the other hand, an operator can readily identify the function icon by his cognitive abilities and select it with the selection device such as a finger or indicator control. This measure prevents that, e.g., the operating surface automatically carries out an undesired activation but rather an operator is always required for the recognition of the image position and the conversion into the X-/Y-coordinates by selection.

The X-, Y-coordinates of the touch point are sent to the secure monitoring device and checked in it by a receiving and comparison device 102 to see whether the X-, Y-coordinates of the touch point fit the U-/V-coordinates of the function icon. The X coordinate must be within an interval [U|U+ icon width] and the Y coordinate within an interval [V|V+ icon height]. If the coordinates are within the icon boundaries, this is an indication that the operator has recognized the displayed function icon, agrees with the selected function and has confirmed it.

If the coordinates are outside of the function icon the previously made request is rejected and the confirmation procedure is aborted. The function request can then be made again.

Since an insecure input device in the form of the touch display 20 participates in the described exemplary embodiment in the confirmation procedure as a matter of principle, other measures can be taken to increase the reliability of the confirmation procedure.

Thus, the selection of the function icon can be linked to a defined gesture. This means that after the selection of the function icon, e.g. by pressing a mouse key or by holding a finger contact with the touch display 20 a movement should take place with a selection device such as a finger or indicator (e.g., dragging in a defined direction). Further checking in the secure monitoring device does not take place until the gesture is ended.

An unintended confirmation is prevented by the necessary gesture, e.g., if an unintended touching of the function icon on the touch display 20 takes place.

The magnitude and the shape of the gesture such as a linear movement, circular movement can be configured by the operator in the secure monitoring device 78. In order that the secure monitoring device 78 can recognize the gesture, the X-, Y-coordinates are transmitted and evaluated sufficiently often or cyclically.

The required gesture can optionally be selected by the secure monitoring device 78 itself in accordance with the randomness principle. In order to guide the operator better, the selected gesture can be graphically represented together with the function icon such as in FIG. 10.

After a successful confirmation input, i.e., when the received confirmation information in the form of the X-, Y-coordinates agrees with the expectation held in the form of the U-/V-coordinates, the previously selected function is executed by the secure monitoring device in the method step 4. The execution can comprise, e.g., the setting of a secure exit in order to initiate a security-directed action in a periphery with it.

It is provided that the confirmation procedure is concluded within a definable time span. The time span t between the sending of the image 90 and the receiving of the X-/Y-coordinates is measured in a monitoring device 104 and compared with a defined time span $t_{max}$. If this time t exceeds the defined time span $t_{max}$ the confirmation procedure is aborted. The function request can be carried out again thereafter. Therefore, it is prevented that an operator activates a function selection, allows it to stand for a long time and that an unauthorized operator subsequently actuates the selected function.

FIG. 11 shows an alternative method for initiating a security-directed function by the insecure operating device 10 in conjunction with the secure monitoring device 78. The method step S1 for requesting a function by the virtual operating element 88 of the operating device 10 or by the signal generator 96 corresponds to the method step S1 according to FIG. 9 and is therefore not explained further.

The same applies to the identification of the requested function by the evaluation and identification unit 94, that was also explained with reference to FIG. 9.

In the alternative, specific inventive method the following method is used for the iconized confirmation.

The secure monitoring device comprises in its memory 86 for each function to be executed the corresponding function icon 88 that is stored in a customary data format such as, e.g., a bitmap file. The association of the function icon 88 to the corresponding functions is set by a configuration process.

A function icon 88 is removed from the secure memory 86 in accordance with the selected function. The function icon 88 ideally represents the selected function in graphic form as an image and/or text so that the operator can more readily recognize the represented function. At the same time the secure monitoring device 78 generates one at least single-digit random number 106 in a coding device 105 by a random generator 107, which number is stored for a later checking.

The random number 106 is iconized in a device 109 and represented as numeric icon 108 as is shown in FIG. 12 by way of example for a 3-digit number. The function icon 88 is transmitted together with the numeric icon 108 as coded, graphic information to the operating device 10 in the method step S2 and displayed on the display 20. The function icon 88 and a number icon 108, that corresponds to a numeric code, can be transmitted individually or simultaneously to the operating device 10. The transmission takes place by tunneling, wherein tunneling means that the data is transferred unfalsified and without further data processing from the secure monitoring device 78 to the operating device 10. Every code falsification, e.g., through the transmission path, is immediately recognizable by the iconized representation 108.

In the alternative method the operator cognitively recognizes the function shown iconized. If the shown function 88 corresponds to the previously made selection the operator can confirm this by inputting the confirmation code shown iconized in the form of the numeric icon 108.

To this end the operator must cognitively recognize the confirmation code 108 shown in iconized form and input it as a numeric sequence via a virtual keyboard 110 shown on the touch display 20. The inputted numeric sequence is transmitted in method step S3 to the secure monitoring device 78 and checked in the receiving and comparing device 102, during which a check is made whether the confirmation code reported back in the form of the numeric sequence agrees with the previously stored random number 106.

In the affirmative case the function is carried out in method step S4. Otherwise, the confirmation procedure is aborted.

The iconized representation of the confirmation code is machine-readable only with considerable algorithmic complexity. On the other hand, an operator can readily identify the iconized confirmation code by his cognitive abilities and convert it into a machine-readable numeric sequence by typing in the recognized numeric sequence on the keyboard 110. It is prevented by the iconized representation 108 that, e.g., the operator surface directly sends numeric code 108 obtained from the secure monitoring device back into the secure monitoring device and therefore carries out an undesired confirmation, but rather an operator is always required for the recognition of the confirmation code represented in an iconized manner.

After the successful confirmation, i.e., when the received confirmation information—in the present case the numeric sequence—agrees with the expectation held—in the present case the random number—the previously selected function is carried out by the secure monitoring device 78 in the method step S4. This can be, e.g., the setting of a secure exit in order to initiate a security-directed action in the periphery with it.

The confirmation procedure must be concluded within a definable, short time span $t_{max}$. It is prevented in this manner that a first operator activates a function selection, allows it to stand for a long time and that an unauthorized operator subsequently actuates the selected function. The time t is measured by the monitoring device 104 between the reporting back to the operator according to a method step S2 and the confirmation according to a method step S3. If this time t exceeds a defined time span $t_{max}$ the confirmation procedure is aborted. The function request can be carried out again thereafter.

A request for changing the operating mode can also be optionally generated by a hardware key switch.

The insertion/removal of the key into/out of the operating mode selection switch is imitated by a login/logout method by PIN.

The possibility of "dragging" the finger more or less after touching the touch display 20 is utilized according to a specific inventive method in order to produce an analogous setting of a movement for the industrial robot 12. Therefore, the industrial robot 12 can be sensitively controlled according to FIG. 6 in 6 degrees of freedom, e.g., X, Y, Z and orientations A, B, C of a tool 112.

It is possible with the deflection of a finger of an operator to set a position for the industrial robot 12 similar to the cursor control by touchpad in a notebook. The industrial robot 12 can be moved in this case simultaneously in two coordinate directions, e.g., X and Y.

In another mode a speed setting can be generated for the industrial robot 12 by a deflection of a finger: the more the finger is deflected, the faster the robot moves.

After the touching of a selected moving surface 114 shown in FIG. 13 as a virtual operating element the finger can subsequently also be dragged over a limitation 116 over the entire touch display 20 and produce movement settings in this manner After the finger is removed, the industrial robot 12 immediately stands still. Then, the desired surface 114 must be touched again for a new movement setting.

The sensitivity of the reaction to a finger movement can be infinitely adjusted via a virtual operating element 118 such as a slide regulator (e.g., override regulator) for the setting of position as well as for the setting of speed.

The sensitive surface 144 for the 2-D movement is placed in the vicinity of the display edge 36 so that it can still be readily reached by the finger (e.g., by the thumb) with a clear distance to the display edge.

In order to also be able to move in a third coordinate direction (e.g., the Z coordinate of the Cartesian coordinate system), a virtual operating element 120 in the form of a field approximately as wide as a finger is directly placed on the side of the display edge 36 so that this field can be "felt" with a finger in that the finger, in particular the thumb, is guided along the display edge 36. This field generates a one-dimensional movement setting, e.g., in the Z direction.

As a result of the special arrangement the operator can clearly distinguish and blindly reach the two moving fields 114, 120: the field 120 directly on the display edge 36, wherein the finger makes perceptible contact with the housing edge, activates the movement setting for the third dimension (Z dimension). The field 114, that is placed approximately one finger width or one thumb width adjacent to the display edge 36, activates the simultaneous movement setting in two dimensions (X-Y dimensions).

The industrial robot 12 has 6 degrees of freedom. The same method as described above is used for adjusting the orientation of the tool 112 with the three angles (A, B, C). To this end the display is divided into two zones 112, 124.

The moving fields 114, 120 for the dimensions 1-3 (e.g., X, Y, Z) are located, e.g., in the upper zone 122. The moving fields 126, 128 for the dimensions 4-6, e.g., A, B, C are located, e.g., in the lower zone 124. The two zones 122, 124 can be differentiated blindly by the haptic marks in the form of nubs 130, 132, 134.

Therefore, the industrial robot 12 can be moved simultaneously in all 6 degrees of freedom with a multi-touch display 20. With a single-touch display the movement functions can only be used sequentially.

Ideally, the industrial robot 12 is aligned collinearly to the coordinate system of the touch display 20 when moving by the previously explained touch motion function. In this instance the robot movement optimally agrees with the finger movement on the touch display.

However, if the operator turns away to the side with the operating device 10, then this agreement is no longer given. The direction of movement of the robot then no longer agrees with the direction of movement of the finger.

In this instance the coordinate system of the touch display must be recalibrated again with the coordinate system of the robot.

According to the invention a special virtual operating element 136 with an indicator 138 is provided on the touch display 20 according to FIG. 14. This operating element 136 must at first be touched with a finger and subsequently the finger must be dragged in the selected direction of the robot coordinate system, e.g., the X-direction. The X-direction is characterized in the working area of the robot, e.g., by a marking on the floor surface. The movement of the finger on the operating element 136 and therefore the alignment of the indicator 138 take place in parallel with the marking provided in the working area of the robot. Such a marking is characterized by way of example in FIG. 6 with "200". After the finger has been raised from the touch display 20 the direction of the vector between the first touching point and the raising of the finger point is calculated. A rotation matrix is calculated with the aid of this vector, the selected coordinate axis of the robot and of a common Z vector via which all finger movements will be transformed from now on before they are given as movement setting to the robot. Therefore, the recalibration takes place as rapidly as possible with a single gesture. After the recalibration both coordinate systems are again adjusted to one another in a co-linear manner, quasi-merged. For the sake of a better checking ability the direction of the calibrated display coordinate system is graphically represented on the touch display.

The coordinate system for the robot is sketched in FIG. 6. It can be recognized that the marking 20 runs parallel to the X-axis. The Y-axis runs in the plane of the base of the robot 12. The Z axis runs vertically to it, about which the robot 12 can rotate (arrow A1).

In FIGS. 1 and 6 the pivoting and/or rotary movements of the robot 12 and of the arm holding the tool 91 are characterized by the arrows 1,2,3,4,5,6 and A1, A2, A3, A4, A5, A6. Therefore, the robot 12 can move the tool 91 in 6 degrees of freedom in the exemplary embodiment.

This calibration method of the invention, that operates without sensor technology, can also be used for any other coordinate systems such as, e.g., freely definable frames.

The invention claimed is:

1. A method for operating an industrial robot connected to a robot control by an operating device comprising a graphic operator interface, the method comprising:

requesting a desired function or operating mode of the industrial robot by an activation input of at least one operating element by an operator, registering the activation input of the at least one operating element, transmission of the actuation input to a secure monitoring device for enabling and/or monitoring the function to be carried out by the industrial robot or the operating mode, identifying graphic information associated with the requested function or operating mode in the secure monitoring device, coding the graphic information with a random generator and transmitting the coded graphic information (from the secure monitoring device to the operating device and the display of the coded graphic information on the graphic operator interface, registering an activation input of the operator by which the correctness of the displayed, coded graphic information is confirmed, return of a confirmation input from the operating device to the secure monitoring device and comparison of the received confirmation input with the transmitted, coded graphic information, and carrying out the requested function or operating mode upon agreement of the confirmation input with the transmitted, coded graphic information.

2. The method according to claim 1, wherein the comparison of the received confirmation input with the transmitted, coded, graphic information comprises a plausibility check.

3. The method according to claim 1, wherein the at least one operating element is visually represented as a virtual operating element on a display of the graphic operator interface, and that wherein, upon activation of the virtual operating element, a position of the virtual operating element is registered on the display in the form of an X'-, Y'-coordinate.

4. The method according to claim 3, wherein the X'-, Y'-coordinate is sent to, and evaluated in, the secure monitoring device.

5. The method according to claim 3, wherein the X'-, Y'-coordinate is evaluated in the operating device, wherein a function or operating mode corresponding to the X'-, Y'-coordinate is identified, and that a function recognition is transmitted to the secure monitoring device.

6. The method according to claim 1, wherein a signal generator connected to the secure monitoring device is used as the at least one operating element.

7. The method according to claim 1, wherein a corresponding function icon is stored as graphic information in a secure memory of the secure monitoring device for each function or operating mode, that an X'-, Y'-coordinate or a function identification is associated with each function icon, that the function icon is identified by the X'-, Y'-coordinates received by the operating device, or by the signal of the signal generator, and that the function icon is transmitted from the secure monitoring device to the operating device and displayed on the graphical operating interface.

8. The method according to claim 7 wherein the function icon is stored as a file in the secure memory, and is transferred unfalsified and without further data processing from the secure monitoring device to the operating device.

9. The method according to claim 1, wherein a function icon represents the requested function or operating mode in graphic form as image and/or text.

10. The method according to claim 1, wherein the secure monitoring device generates an at least single-digit random number with a random generator, and wherein the random number is stored.

11. The method according to claim 7, wherein a random number is represented iconized and as a numeric code in the form of a numeric icon together with the function icon as coded graphic information.

12. The method according to claim 1, wherein the confirmation input of the operator comprises an input of a numerical sequence given by an iconized numeric code via an input unit of the graphic operator interface, wherein the input of the numerical sequence is registered by touching virtual keys of the numeric keyboard displayed on a touch display.

13. The method according to claim 1, wherein an inputted numeric sequence is transmitted to the secure monitoring device and compared with a previously stored random number, and wherein, upon agreement of the random number with the inputted numeric sequence, the requested function or operating mode is executed by the secure monitoring device.

14. The method according to claim 1, wherein a time span t between a sending of the numeric code and a reception of the numeric sequence is measured, and wherein, if the time span t exceeds a pre-defined time span $t_{max}$, a confirmation procedure is aborted.

15. The method according to claim 1, wherein:
coding of the graphic information comprises the generating of an image in which the graphic information is positioned on a random display position determined by the secure monitoring device,
the image is sent to the operating device and displayed together with the graphic information on the graphic operator interface,
a touch position is registered when the displayed graphic information is touched by the operator,
the touch position is sent back to the security control,
the received touch position is compared with the given display position, and
the selected function or operating mode is executed if the touch position agrees with the display position.

16. The method according to claim 15, wherein the image in the secure memory of the secure monitoring device with empty image content is stored in a data format corresponding to a data format of the function icon, and wherein the image with empty image content is used as an image frame for representing the at least one function icon.

17. The method according to claim 7, wherein the function icon is removed from a secure memory according to the selected function or operating mode, and copied into the image at a randomly selected U-/V-position.

18. The method according to claim 1, wherein a selected U-/V-position is determined by the random generator and is known only to the secure monitoring device.

19. The method according to claim 7, wherein the image, which is an image frame with the function icon is sent in its entirety to the operating device and displayed on the display at a defined position.

20. The method according to claim 16, wherein, upon a confirmation of the function icon shown in the image, the an X-, Y-coordinate of the selection point is registered and sent to the secure monitoring device, and that wherein the X-, Y-coordinate is compared to the U-V position of the function icon in the image, and wherein, if the coordinates coincide, the requested function or operating mode is executed.

21. The method according to claim 20, wherein a check is made to determine whether the X coordinate is within an interval [U|U+ icon width], and whether the Y coordinate is within an interval [V|V+ icon height], and wherein, if the X-, Y-coordinates are within the intervals, whether a confirmation input is present.

22. The method according to claim 7, wherein an activation of the function icon is linked to a defined gesture, wherein, after the activation of the function icon when a mouse key is pressed or when a finger contact on the touch display is held down with the selection device, a movement must take place, wherein the movement comprises dragging, in a defined direction, a linear movement and a circular movement.

23. A secure monitoring device for the enabling and monitoring of a function to be performed by an industrial robot, the device comprising:
the secure monitoring device coupled to a control device controlling the industrial robot and to an operating device for requesting the function to be performed for the exchange of data, wherein the secure monitoring device comprises:
an evaluation and identification device for evaluating the requesting of functions and the identification of graphic information corresponding to the function,
a coding device for coding the graphic information,
a transmission device for transmitting the coded graphic information to a graphical user interface of the operating device, and
a receiving and comparing device for receiving a confirmation input from the operating device, and for comparing the confirmation input with the coded graphic information;
wherein an activation input of at least one operating element is registered, and an actuation input is transmitted to the secure monitoring device for enabling and/or monitoring the function to be carried out by the industrial robot or an operating mode;
wherein an activation input of an operator is registered, by which a correctness of a displayed, coded graphic information is confirmed, and
wherein a requested function or the operating mode is carried out, upon agreement of a confirmation input with transmitted, coded graphic information.

24. The secure monitoring device according to claim 23, wherein the secure monitoring device comprises a secure memory in which the at least one piece of graphic information is stored as a function icon.

25. The secure monitoring device according to claim 23, wherein the coding device comprises an image generating device with which a function icon is copied into an image with empty image content stored in the memory at a random U-/V position.

26. The secure monitoring device according to claim 23, wherein an image generating device comprises a random generator with which the U-/V position is generated.

27. The secure monitoring device according to claim 23, wherein the coding device is coupled to the comparison device and/or wherein the coding device comprises a random number generator for generating a random number, and comprises an iconizing device for generating a numeric icon for the random number.

28. The secure monitoring device according to claim 23, wherein the comparison device is coupled to a secure output for carrying out or enabling the requested function.

29. The secure monitoring device according to claim 23, wherein the secure monitoring device comprises a time monitoring device for monitoring a time span t from a sending of the coded graphic information to the reception of the confirmation input.

30. The method according to claim 1, wherein the graphic operator interface is a touch display.

31. The method according to claim 5, wherein the function recognition is a function name or function number.

32. The method according to claim 6, wherein the signal generator is a key switch or key.

33. The method according to claim 8, wherein the file is a bitmap file.

34. The method according to claim 12, wherein the input unit is a numeric keyboard.

35. The method according to claim 15, wherein the selected function or operating mode is executed if the touch position agrees with the display position within a defined tolerance.

36. The device according to claim 24, wherein the secure memory is a two-channel secure memory.

* * * * *